US007548151B2

(12) United States Patent
Roosli et al.

(10) Patent No.: US 7,548,151 B2
(45) **Date of Patent: *Jun. 16, 2009**

(54) POWER MANAGEMENT LOCK SYSTEM AND METHOD

(75) Inventors: Philipp A. Roosli, Mountain Lakes, NJ (US); Eric Larson, Westerly, RI (US); Ravi Sagar, Waterbury, CT (US)

(73) Assignee: Inncom International Inc., Niantic, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 11/705,362

(22) Filed: Feb. 12, 2007

(65) Prior Publication Data

US 2007/0146115 A1 Jun. 28, 2007

Related U.S. Application Data

(63) Continuation-in-part of application No. 11/082,559, filed on Mar. 17, 2005, and a continuation-in-part of application No. 11/082,577, filed on Mar. 17, 2005.

(60) Provisional application No. 60/647,659, filed on Jan. 27, 2005, provisional application No. 60/647,741, filed on Jan. 27, 2005.

(51) Int. Cl.
*G05B 19/00* (2006.01)

(52) U.S. Cl. ....................................... 340/5.6; 340/5.61

(58) Field of Classification Search .................. 340/5.6, 340/5.61, 5.62, 5.63, 5.64, 5.65, 5.66, 5.7; 70/277, 278.1, 278.2, 280, 281, 282; 361/172; 235/382, 382.5

See application file for complete search history.

(56) References Cited

U.S. PATENT DOCUMENTS

| | | | | |
|---|---|---|---|---|
| 4,425,597 | A * | 1/1984 | Schramm | 361/172 |
| 4,929,005 | A * | 5/1990 | Heinen | 292/251.5 |
| 5,132,661 | A * | 7/1992 | Pinnow | 340/5.28 |
| 5,321,963 | A * | 6/1994 | Goldman | 70/278.1 |
| 5,608,298 | A * | 3/1997 | Frolov et al. | 318/286 |
| 5,781,399 | A * | 7/1998 | Lanigan et al. | 361/172 |
| 5,920,268 | A * | 7/1999 | Bucci et al. | 340/5.64 |
| 5,936,544 | A * | 8/1999 | Gonzales et al. | 340/5.22 |
| 6,609,738 | B1 | 8/2003 | Roth et al. | |
| 6,615,629 | B2 * | 9/2003 | Bates et al. | 70/434 |
| 6,720,861 | B1 * | 4/2004 | Rodenbeck et al. | 340/5.64 |
| 7,170,998 | B2 | 1/2007 | McLintock et al. | |
| 2003/0098777 | A1 * | 5/2003 | Taylor et al. | 340/5.61 |
| 2003/0132829 | A1 * | 7/2003 | Frolov et al. | 340/5.7 |
| 2004/0045330 | A1 * | 3/2004 | Moon et al. | 70/107 |

FOREIGN PATENT DOCUMENTS

WO WO 00/77330 A1 * 12/2000

* cited by examiner

*Primary Examiner*—Edwin C Holloway, III
(74) *Attorney, Agent, or Firm*—Cantor Colburn LLP

(57) ABSTRACT

A power management lock system including an electronic lock unit configured to lock and unlock a door and further including at least one sensor in communication with the electronic lock unit, the sensor configured to sense an open condition of the door and a closed condition of the door, wherein the electronic lock unit is configured to receive door data pertaining to the open condition and the closed condition from the at least one sensor, and where the electronic lock unit is further configured to manage the provision of power within the electronic unit based upon the door data.

10 Claims, 4 Drawing Sheets

POWER MANAGEMENT LOCK SYSTEM AND METHOD

CROSS-REFERENCE TO RELATED APPLICATIONS

This application is a continuation-in-part of and claims the benefit of U.S. patent application Ser. Nos. 11/082,559 and 11/082,577, both filed on Mar. 17, 2005, where both said applications claim the benefit of U.S. Provisional Patent Application Nos. 60/647,659 and 60/647,741 both filed on Jan. 27, 2005. The entire contents of all four cited applications are incorporated by reference herein.

FIELD OF THE INVENTION

The invention relates generally to lock systems and, more particularly, to power management of an electronic lock system configured to allow access to an individual unit of a multi-unit building.

BACKGROUND OF THE INVENTION

Traditional electronic door locks of the type typically used in hotel guest rooms do not effectively manage lock power consumption in a manner that compensates for open and closed conditions of hotel doors. As properly powered and functioning electronic locks are obviously critical to hotel operation, power supply to hotel door locks is always a concern. This concern is heightened in applications where power is at a premium, such as in the case of inductively powered door locks with only a small emergency battery. In these types of applications, power management that is specific to open and closed conditions of hotel doors is desirable.

Using inductively powered door locks as an example, when a door is closed (i.e. in the frame), inductively powered door locks have sufficient power available from induction to operate lock electronics. However, when a door is open, inductive power transfer ceases because the distance between transmitter and receiver in the inductive system exceeds the size of the corresponding magnetic field. With the lock operating in a normal manner during open conditions, a storage device disposed in the door lock that has been charged by inductive power transfer might be depleted at too fast a rate, particularly when a door is left open for a relatively long period of time (such as during room cleaning). If the storage device is depleted, the system necessarily falls back on the small emergency battery mentioned above. Fall back to the emergency battery is undesirable in that it could lead to a rapidly depleted battery, and thus a non-functioning lock. This may generate a need to equip the locks with more powerful batteries, and thus generate greater expense to the hotel.

However, an electronic lock of an open door obviously does not have to operate in a normal manner. That is, there may be no need to operate some of the lock's electronics, such as a credential sensing mechanism, during open conditions. Accordingly, electronic lock system power management strategies that take power needs during open and closed conditions into account would be advantageous.

SUMMARY OF THE INVENTION

The invention generally provides a power management lock system including an electronic lock unit configured to lock and unlock a door and further including at least one sensor in communication with the electronic lock unit, the sensor configured to sense an open condition of the door and a closed condition of the door, wherein the electronic lock unit is configured to receive door data pertaining to the open condition and the closed condition from the at least one sensor, and where the electronic lock unit is further configured to manage the provision of power within the electronic unit based upon the door data.

The invention further generally provides a power management lock system including a power signal generator configured to generate a wireless power signal, an electronic lock unit configured to lock and unlock a door, the electronic lock unit including a control assembly, and an energy storage device, the power signal generator being configured to provide power to the energy storage device via the wireless power signal transmitted from the power signal generator to the energy storage device, a plunger associated with the door, the plunger sensing a closed condition of the door when the plunger is depressed, and the plunger sensing an open condition of the door when the plunger is extended, and a power sensor configured to sense at least one of a presence and strength of the wireless power signal, wherein the control assembly of the electronic lock unit is configured to receive door data pertaining to the open condition and the closed condition from the plunger, and wherein the electronic lock unit is configured to operate in an open power save mode when the door data indicates the door to be in the open condition, and wherein the power sensor is configured to transmit power data pertaining to at least one of the presence and the strength of the wireless power signal to the control assembly when the power sensor senses that the door is in the closed position, and wherein at least a portion of the control assembly receives power from the energy storage device.

The invention further provides a method for managing power consumption in an electronic lock system corresponding to the various exemplary embodiments referenced above. Particularly, the method is generally described as comprising sensing an open condition of a door, transmitting open door data pertaining to the open door condition to a control assembly of an electronic lock unit, and at least partially disabling the electronic lock unit when the open door data is transmitted to the control assembly.

The above discussed and other features and advantages of the present invention will be appreciated and understood by those skilled in the art from the following detailed description and drawings.

BRIEF DESCRIPTION OF THE DRAWINGS

Referring now to the drawings wherein like numerals designate like components.

DETAILED DESCRIPTION OF THE PREFERRED EMBODIMENT

Figure 1:
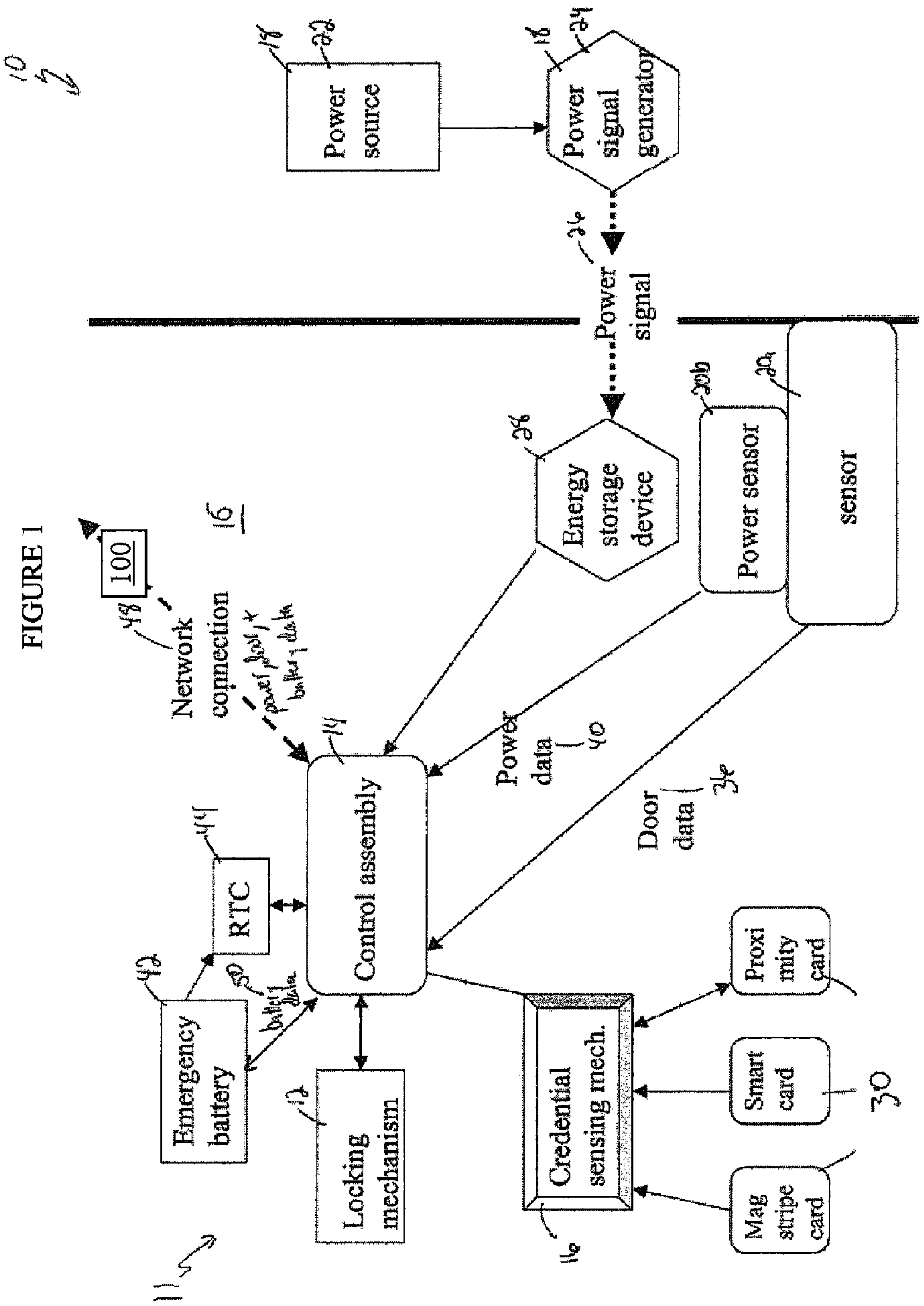
FIG. 1 is a schematic representation of a lock system in one exemplary embodiment of the invention.
Figure 2:
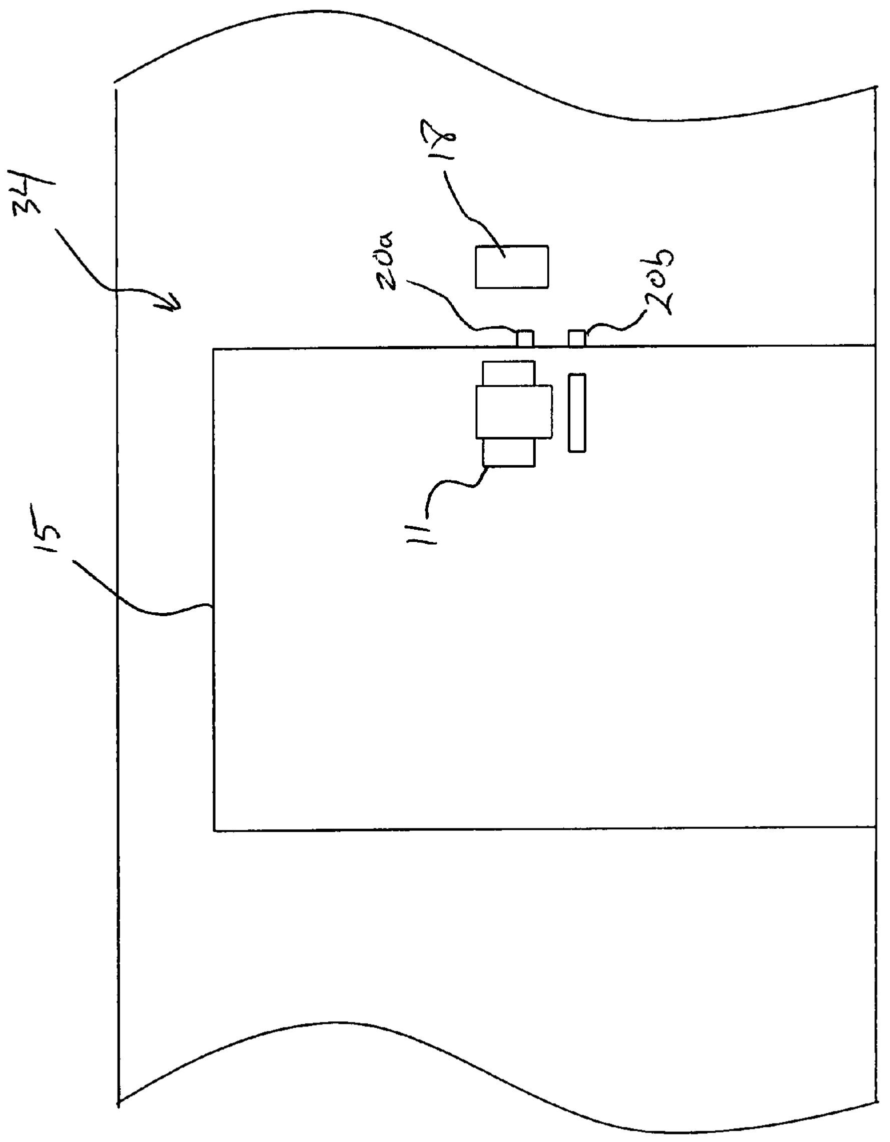
FIG. 2 shows the lock system of FIG. 1 disposed relative to a door in a closed condition.

FIGS. 1-2 show an exemplary power management electronic lock system 10 in accordance with an embodiment of the invention. The system 10 includes an electronic lock unit 11 disposed in a door 15 and a power generating system 18 disposed external to the door 15. The electronic lock unit 11 comprises, among other elements, a locking mechanism 12, a corresponding lock control assembly 14, a credential sensing mechanism 16, at least one sensor 20*a*, 20*b*, and an energy storage device 28. The power generating system 18 generally includes a power source 22 and a power signal generator 24.

Generally, the electronic lock unit 11 and/or the power generating system 18, in one embodiment of the invention, are similar to that disclosed in U.S. patent application Ser. Nos. 11/082,559 and 11/082,577, both filed on Mar. 17, 2005, the entire contents of both said applications is incorporated by reference herein.

As will be discussed herein at length, the control assembly 14, which includes a microprocessor (not shown) and an electronic memory (not shown), receives data from the sensors 20*a-b,* is primarily powered inductively by the power generating system 18, and generally controls the electronic lock unit 11 and is responsible for internal communication within the unit 11 as well as external communication, for example, with a network, etc.

As mentioned, in the present exemplary embodiment, the power generating system 18 includes a power source 22 and a power signal generator 24. Also as mentioned, the power source 22 and power signal generator 24 are disposed externally of the electronic lock unit 11. For example, with specific reference to FIG. 2, the electronic lock unit 11 is disposed within the door 15 of a multi-unit building, while the power source 22 and a power signal generator 24 of the power generating system 18 are disposed outside of but proximate to the door 15. For example, the power generating system 18 is preferably disposed outside of the door 15, within a wall or door frame, in a position generally adjacent to the electronic lock unit 11.

The power source 22, which could be, for example, a switch mode power supply, a transformer, a traditional or rechargeable battery pack or any combination thereof, provides power to the power signal generator 24. Typically, the power source 22 is the hardwired electronic system of the multi-unit building. The power signal generator 24 uses the power provided by the power source 22 to generate a power signal 26, which is received by the energy storage device 28 of the electronic lock unit 11 which is connected to the control assembly 14 and disposed within the door 15. The power signal generator 24 generally comprises any device capable of wirelessly transmitting the power signals 26. The power signals 26 may take any suitable form such as radio frequency (RF) signals, light signals, etc. The energy storage device 28 generally comprises any corresponding device capable of receiving such power signals 26 and configured for converting the signals 26 into electrical energy. For example, the power signal generator 24 and the energy storage device 28 may include traditional AM/FM antennae where the power signals 26 include RF signals. Alternatively and/or additionally, the power signal generator 24 may comprise a controlled or uncontrolled light source such that the power signals 26 include light signals. The energy storage device 28 may then correspondingly comprise a solar panel arrangement for receiving the light signals 26 and converting them to electrical power. Alternatively and/or additionally, the power signal generator 24 and the energy storage device 28 may comprise split air gap transformers or any other type of inductive, magnetic, or capacitive coupling arrangements suitable for facilitating transmission and reception of the electromagnetic signal 26. In any event, the energy storage device 28 receives the power signals 26 (which are electromagnetic in an exemplary embodiment) from the power signal generator 24 and converts those signals 26 to stored electrical energy.

As mentioned above the energy storage device 28 is connected to the control assembly 14. Under normal operation of the system 10, the energy storage device 28 powers the control assembly 14. That is, the energy storage device receives the wireless power signal 26 from the generator 28, converts it electrical power, and then provides such power to the control assembly 14 as needed. The control assembly 14 is configured such that, when powered, the assembly 14 can actuate the locking mechanism 12 into locked and unlocked positions, communicate with the network via a wireless network connection 48, receive data from the credential sensing mechanism 16 which is disposed for reading data from access cards 30 such as magnetic stripe cards, smart cards, and proximity cards, and the control assembly 14 is further configured to evaluate this data and, based thereupon, grant or deny access.

Figure 3:
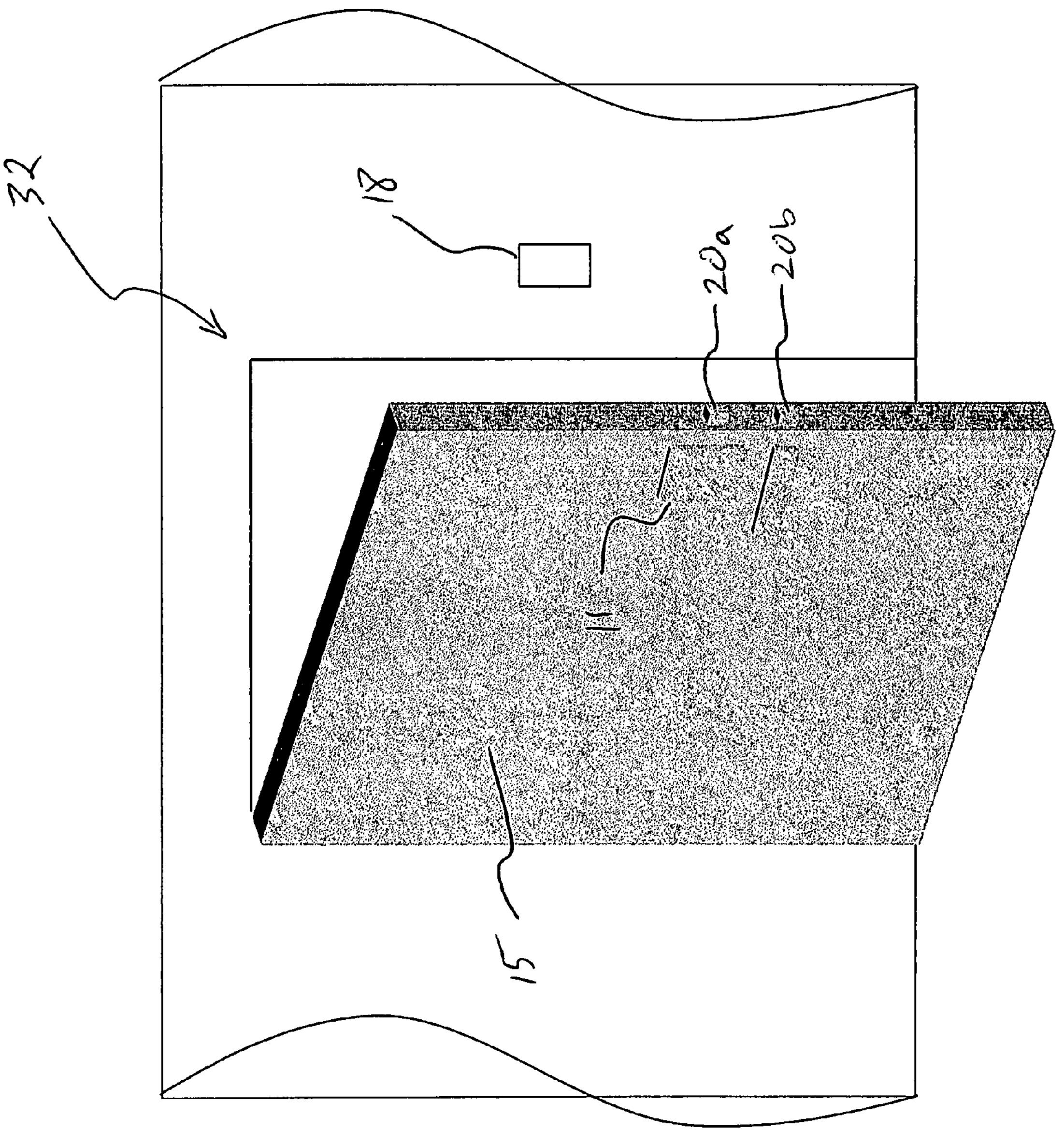
FIG. 3 the arrangement of FIG. 2 with door in an open condition.

As mentioned above, lock unit 11 of the power management system 10 also includes at least one sensor 20*a-b,* which will now be discussed in detail hereinbelow, beginning with the sensor 20*a*. In this embodiment, the sensor 20*a* is disposed in the door 15 and is arranged in logical association with the control assembly 14 The sensor 20*a* is used to sense an open 32 and a closed 34 condition of the door 15, and may comprise any device capable of sensing such conditions 32 and 34. For example, the sensor 20*a* may be a spring biased plunger (such as in the exemplary embodiment of FIGS. 1-3) disposed with the door 15, wherein depression of the plunger 20*a* indicates (via data transmission discussed below) to the control assembly 14 that the door 15 is in the closed condition 34, and wherein extension of the plunger 20*a* indicates to the control assembly 14 that the door 15 is in the open condition 32. That is, in this embodiment, the plunger 20*a* is essentially a physical protrusion extending from the door 15 and disposed to engage the door frame when the door 1S is brought into the closed condition 34. In this condition, the plunger 20*a* contacts the door frame and is biased thereby into a retracted position within a body of the door 15. When the door is placed in the open condition 34, the plunger 20*a* is released from the door frame and an internal spring arrangement biases the plunger 20*a* outward into a protruded position.

Of course this plunger configuration of the sensor 20*a* is merely exemplary. For example, the plunger 20*a* may be disposed in the door frame rather than in the door 15. In this configuration, the sensor 20*a* would then communicate the opened and closed conditions 32, 34 wirelessly to the control assembly 14. Alternatively and/or additionally, the sensor 20*a* may be an optical sensor disposed on either the door 15 or the door frame, where the optical sensor is configured to sense at least a portion of the door frame or door, respectively, and indicate to the control assembly 14 upon such detection (via wired or wireless connection) that the door 15 is in the closed condition 34. The optical sensor 20*a* is further configured to indicate to the control assembly 14 that the door 15 is in the open condition 32 when the mentioned portion of the door frame or door is not detected.

Regardless of the manner by which the sensor 20*a* senses the open 32 and closed 34 conditions of the door 15, the sensor 20*a* transmits door data 36 pertaining to the open and closed conditions 32, 34 of the door 15 to the control assembly 14 as illustrated schematically in FIG. 1. When the door data 36 from the sensor 20*a* indicates that the door 15 is in the open condition 32, the control assembly 14 initiates an open power save mode and at least partially disables at least a portion of the electronic lock unit 11. For example, since the credential sensing mechanism 16 is not necessary during the open condition 32 of the door 15, the control assembly 14 may disable the credential sensing mechanism 16 while the door 15 is in the open condition 32. Alternatively and/or additionally, since the locking mechanism 12 is not necessary during the open condition 32 of the door 15, the control assembly 14 may disable the locking mechanism 12 while the door 15 is in the open condition 32. Alternatively and/or additionally, the control assembly 14 may be configured to disable itself, and thus by extension, disable all components of the electronic lock unit 11 (i.e., the energy storage device 28, credential sensing mechanism 16, locking mechanism 12, etc.) while the door 15 is in the open condition 32. Any disablement of the electronic locking unit 11 or some or all of its various components while the door 15 is in the open condition 32 may last throughout the duration of this condition 32 and cease once the sensor 20*a* transmits additional door data 36 to the control assembly 14 that indicates that the door 15 has re-entered the closed condition 34.

Disablement of the electronic lock unit 11 or some or all of its components during the open condition 32 of the door 15 effectively results in power not be drawn from the energy storage device 28 or the emergency battery 42 by the various unit 11 components. This preserves the powered stored within the electronic lock unit 11.

When the sensor 20*a* indicates that the door 15 is in the closed position, the control assembly 14 and the various lock components (the locking mechanism 12, credential sensing mechanism, etc.) are enabled and are thus rendered available to receive electronic power from the energy storage device 28 and/or from the emergency battery 42, as necessary.

The sensor 20*b* is used to sense overall power failure within the system 10 when the door is brought into the closed condition 34. The power sensor 20*b* senses presence of the power signal 26 and may comprise any device capable of sensing this signal. For example, if the power signal 26 is an electromagnetic signal, such as in the exemplary embodiment of FIGS. 1-3, the power sensor 20*b* is a sensor configured to sense an electromagnetic field.

The power sensor 20*b* is connected communicatively with the control assembly 14, and may be disposed anywhere within range of the power signal 26, such as on the sensor 20*a* (i.e. on the plunger), in the door 15, or on the doorframe. As with the sensor 20*a*, if the sensor 20*b* is disposed outside of the door 15, the connection with the control assembly 14 is wireless. When the door 15 is in the closed condition 32, as detected by the sensor 20*a*, the control assembly 14 activates the power sensor 20*b* which transmits power data 40 pertaining to presence/strength of the power signal 26 to the control assembly 14. If the power signal 26 is present and strong, the power data 40 will indicate this condition to the control assembly 14 and normal operation of the electronic locking unit 11 will continue. If however, the power signal 26 is absent/weak, the power data 40 will indicate this condition to the control assembly 14 which will initiate a power fail mode within the electronic locking unit 11. When placed in power fail mode, the control assembly 14 initiates receipt of power from an emergency battery 42 disposed in the electronic locking unit 11. Alternatively and/or additionally, the control assembly 14 may initiate a slowing of operation of the electronic locking unit 11 during the power fail mode. This slowing may be accomplished using a real time clock (RTC) 44, included within the electronic locking unit 11, connected to the control assembly 14, and powered by the emergency battery 42 during the power fail mode. For example, using the RTC 44, the control assembly 14 may poll the credential sensing mechanism 16 for card insertion at greater intervals of time than a standard twice per second.

It should be appreciated that, in alternative embodiment, the sensor 20*b* may also transmit power data 40 to the control assembly when the door 15 is in the open condition 32. In this embodiment, the system may or may not include the sensor 20*a*. That is, the sensor 20*b* effectively detects the open condition 32 by sensing the weak or absent power signal 26. Accordingly, the power fail mode mentioned above may substantially correspond to the open condition 32, in response to which the control assembly 14 may disable certain components of the lock unit 11 or slow operation, etc. As generally referred to above, the control assembly 14 may be connected to, and in communication with, a network (LAN, WAN, etc.), an associated server, and/or additional peripheral devices by the network connection 48 via a transceiver 100. Through this network connection 48, the control assembly 14 of the door 15 may be associated with the network/server of the multi-unit building. The control assembly 14 may transmit door data 36, power data 40, and battery data 50 pertaining to power levels of the emergency battery 42 over the network connection 48, and communicate with the network (or the like) via any suitable protocol (e.g., TCP/IP, UDP/IP, Inncom International, Inc.'s proprietary P5 Protocol, etc.). The connection 48 may be wired or wireless, as desired. Wireless communication between the control assembly 14 and the network and/or between the control assembly 14 and any component of the electronic locking unit 12 or sensors 20*a-b* is preferably conducted via radio frequency (RF) communication, but may alternatively and/or additionally utilize infrared (IR) or other types of communication (e.g., ultrasound (U/S), etc.). Such wireless RF communication may utilize, for example, 802.11 b radio frequency protocol, WI-FI, Bluetooth®, 802.15.4, or any other suitable wireless protocol.

Figure 4:
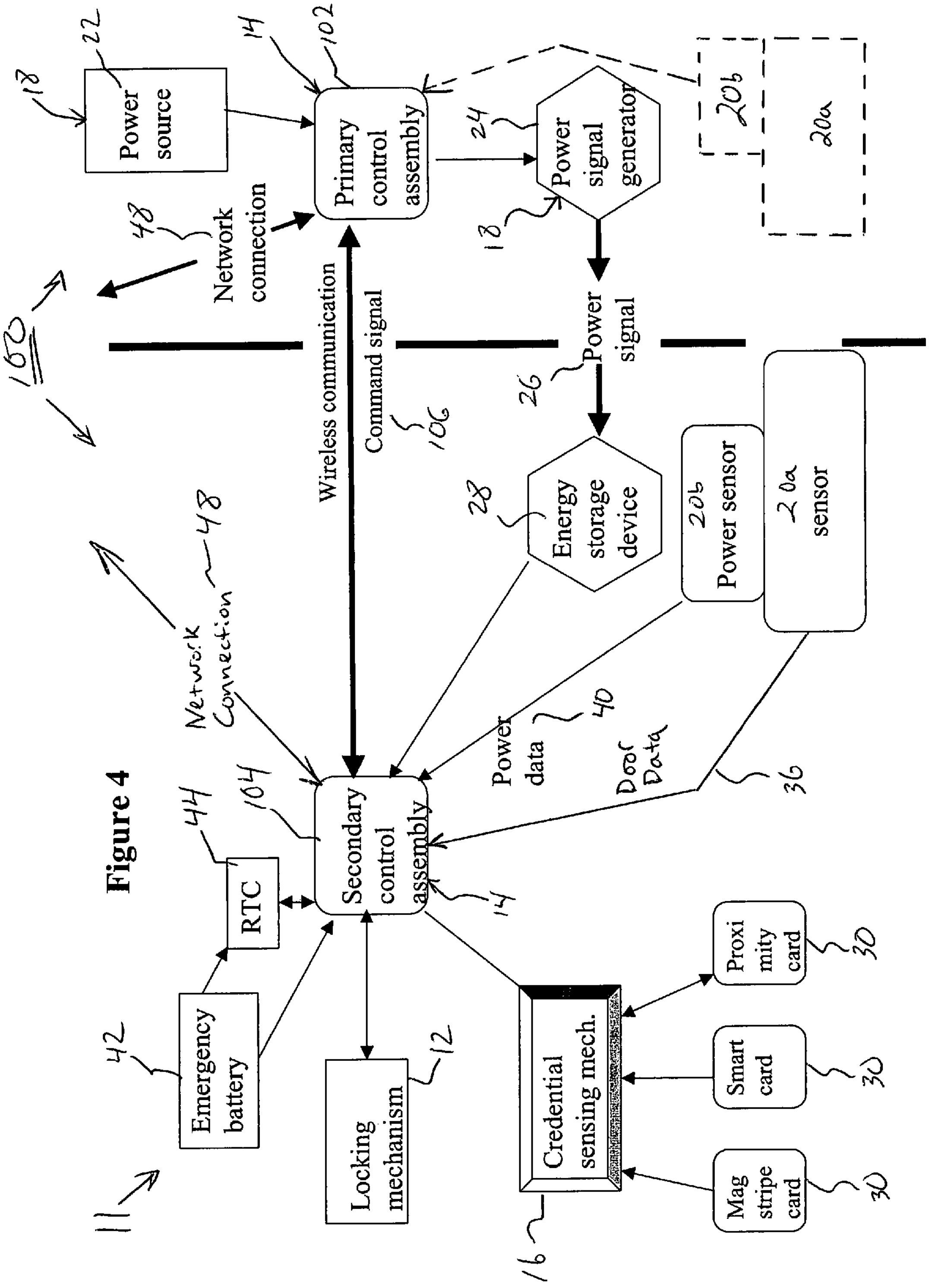
FIG. 4 is a schematic representation of a lock system in another embodiment of the invention.

A power managing lock system 100 in an alternative embodiment of the invention is shown in FIG. 4. The system 100 resembles the system 10 and includes many of the features and provisions thereof. Common elements are represented herein and throughout by consistent reference numerals and, for the sake of brevity, are not reintroduced nor unnecessarily re-described. The system 100 significantly differs from the system 10 in that the control assembly 14 of the system 100 includes a portion 102 of the control assembly 14 disposed outside of lock unit 11 and preferably disposed outside of the door 15 and in connection with the power generating system 18.

That is, in this embodiment, the control assembly 14 is divided into a primary access control assembly 102 and a secondary access control assembly 104, each including a microprocessor and an electronic memory (not shown). The primary access control assembly 102 is be disposed outside of the door 15 in the wall or door frame, and is therefore remote of the lock unit 11. The secondary control assembly 104 is disposed within the door 15 and is arranged in communication with the locking mechanism 12 and energy storage device 28. The credential sensing mechanism 16 is be disposed within the door 15 and is in direct connection with the secondary control assembly 104 (as shown in FIG. 4). Alternatively, the credential sensing mechanism may be disposed outside of the door 15 (i.e. on the wall in proximity to the door 15) and in direct connection with the primary control assembly 102.

The primary and secondary control assemblies 102 and 104 of the system 100 may comprise some or all of the features of the primary and secondary access control electronics disclosed in U.S. patent application Ser. No. 11/082,577 and some or all of the features of the access control electronics and the control circuitry and data communication section as disclosed in U.S. patent application Ser. No. 11/082,559, both of which said applications are herein incorporated by reference in their entirety.

As shown in FIG. 4, the primary control assembly 102 is in logical association with the secondary control assembly 104 via any form of wireless communication 106, such as the radio frequency (RF) or infrared (IR) communications discussed above. The primary control assembly 102 is also directly connected with the power source 22, from which it receives its power. The power signal generator 24 may also receive power directly from the power source 22, or, as shown in Figure, from the primary control assembly 102. The primary control assembly 102 is further disposed in communication with the power signal generator 24.

The electronic lock unit 11 of the system 100 includes the sensors 20*a* and 20*b* discussed above concerning the system 10. That is, the sensors 20*a* and 20*b* are disposed in the door 15 of the system 100 and are arranged in communication with the secondary control assembly 104. As discussed, the sensor 20*a* is configured to detect and to alert the control assembly 104 of the open and closed conditions 32, 24 of the door 15. The power sensor 20*b* is configured to detect and alert the secondary control assembly 104 of the weak or absent power signal 26. The secondary control assembly 104 reacts to these alerts as discussed above with regard to the control assembly 14 of the system 10.

In an alternate embodiment, one or more of the sensors 20*a* and 20*b* of the power management electronic lock system 100 are disposed outside of the door 15 in the adjacent wall or door frame proximate to the primary control assembly 102 and/or proximate to the power generating system 18. In this configuration (shown in dashed lines in FIG. 4), the sensors 20*a* and 20*b* respectively monitor the open/closed condition of the door and the strength of the power signal 26 from outside of the door 15 and communicate wirelessly or via wired connection with the primary control assembly 102. The primary control assembly 102 receives this communication from the sensors 20*a* and 20*b* and then send appropriate wireless commands 106 to the secondary control assembly which, in response thereto, disables or slows operation of the various components of the lock unit 11 as discussed previously concerning the system 10.

In still another embodiment, one or more of the sensors 20*a* and 20*b* is be disposed in the wall or door frame outside of the door 15 and is configured to monitor respectively the condition of the door and the strength of the power signal 26 and to communicate wirelessly directly with the secondary control assembly 104 without routing commands through the primary control assembly 102. In such configuration, the sensors 20*a* and 20*b* may communicate with the secondary control assembly entirely independent of the primary control assembly 102 or may conduct some communications directly with the secondary control assembly 104 and some communications via the primary control assembly 102.

The primary control assembly 102 and/or secondary control assembly 104 may be connected to, and in communication with, a network (LAN, WAN, etc.), an associated server, and/or additional peripheral devices via a network connection 48. Via this network connection 48 the primary control assembly 102 and/or secondary control assembly 104 of the system 100 may be associated with the network/server of the multi-unit building.

As mentioned, the sensors 20*a* and 20*b* may be disposed within the door 15 in both power management electronic lock systems 10 and 100. In either system 10 or 100, the sensors 20*a* and 20*b* configured as such can communicate with the control assembly 14 and with the secondary control assembly 104, respectively, via a hard wired connection extending through the door 15 or via a wireless communication.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best modes contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A power management lock system for use with a single unit of a multi-unit building, including a server associated with a network thereof, the system comprising:

a lock unit including a control assembly, a locking mechanism configured to lock and unlock a door of the single unit, and a credential sensing mechanism to enable operations of the locking mechanism in accordance with a verification, by the credential sensing mechanism, of an identity of an authorized potential occupant seeking entry to the single unit;

a transceiver, coupled to the lock unit, disposed in signal communication with the server to communicate information relating to the lock unit to the server; and a sensor disposed in signal communication with the control assembly and configured to sense whether the door is open and to indicate to the control assembly when the door is open, wherein the control assembly is configured to receive the open door indication and, upon such receipt, to cease provision of power to the locking mechanism and the credential sensing mechanism and to simultaneously maintain provision of power to the transceiver.

2. The system of claim 1, wherein the lock unit operates in a power save mode when the door is open.

3. The system of claim 1, wherein the lock unit further includes an energy storage device to which a power signal generator provides power via a power signal, and wherein the sensor senses a presence and a strength of the power signal.

4. The system of claim 3, wherein the sensor transmits data pertaining to the presence and the strength of the power signal to the control assembly.

5. The system of claim 3, wherein the control assembly accepts power from an emergency battery and initiates a slowing in operations thereof when the sensor senses an absence and/or a weakness of the power signal, wherein the lock unit further includes a real time clock by which the control assembly initiates the slowing, and wherein the real time clock is powered by the emergency battery.

6. The system of claim 3, wherein the power signal generator is disposed in a position which is remote from the door and the control assembly.

7. The system of claim 3, wherein the power signal generator is configured to wirelessly transmit the power signal to the energy storage device.

8. The system of claim 3, wherein the power signal is an electromagnetic signal and the sensor comprises a magnetic field sensor configured to sense the electromagnetic signal.

9. The system of claim 1, wherein the sensor comprises a plunger that is depressed when the door is closed and extended when the door is open.

10. A method for use in a system including a single unit of a multi-unit building, a server associated with a network of the building and a lock unit, the lock unit including controller, a mechanism configured to lock and unlock a door of the single unit and a credential sensing mechanism to enable operations of the mechanism, the method comprising:

communicating information relating to the lock unit between the server and a transceiver coupled to the lock unit;

sensing, by a sensor disposed in logical communication with the controller, whether the door is open;

transmitting a signal from the sensor to the controller indicating that the door is open; and upon receipt of the open door signal, ceasing provision of power to the locking mechanism and the credential sensing mechanism and simultaneously maintaining provision of power to the transceiver.

* * * * *